(12) United States Patent
Iwasaki et al.

(10) Patent No.: US 10,668,964 B2
(45) Date of Patent: Jun. 2, 2020

(54) RUNNING DEVICE

(71) Applicants: MITSUBISHI HEAVY INDUSTRIES, LTD., Tokyo (JP); FUKUYAMA RUBBER IND. CO., LTD., Fukuyama-shi, Hiroshima (JP)

(72) Inventors: Koji Iwasaki, Tokyo (JP); Itaru Ishikawa, Tokyo (JP); Ryosuke Imada, Tokyo (JP); Takehiko Kiso, Fukuyama (JP); Hirotaka Ozaki, Fukuyama (JP); Tatsuya Noritoh, Fukuyama (JP)

(73) Assignees: MITSUBISHI HEAVY INDUSTRIES, LTD, Tokyo (JP); FUKUYAMA RUBBER IND. CO., LTD., Hiroshima (JP)

( * ) Notice: Subject to any disclaimer, the term of this patent is extended or adjusted under 35 U.S.C. 154(b) by 588 days.

(21) Appl. No.: 15/128,498

(22) PCT Filed: Mar. 18, 2015

(86) PCT No.: PCT/JP2015/058126
§ 371 (c)(1),
(2) Date: Sep. 23, 2016

(87) PCT Pub. No.: WO2015/146753
PCT Pub. Date: Oct. 1, 2015

(65) Prior Publication Data
US 2017/0106923 A1 Apr. 20, 2017

(30) Foreign Application Priority Data

Mar. 24, 2014 (JP) ................................ 2014-059842

(51) Int. Cl.
*B62D 55/14* (2006.01)
*B62D 55/24* (2006.01)
*B62D 55/125* (2006.01)

(52) U.S. Cl.
CPC ......... *B62D 55/244* (2013.01); *B62D 55/125* (2013.01); *B62D 55/14* (2013.01)

(58) Field of Classification Search
CPC ..... B62D 55/14; B62D 55/253; B62D 55/202
See application file for complete search history.

(56) References Cited

U.S. PATENT DOCUMENTS 5,295,741 A * 3/1994 Togashi ................. B62D 55/24
305/171
2005/0056468 A1* 3/2005 Tucker ................ B62D 55/065
180/9.1

FOREIGN PATENT DOCUMENTS

JP 63258276 A * 10/1988 ........... B62D 55/202
JP 5-162667 A 6/1993
(Continued)

OTHER PUBLICATIONS

International Preliminary Report on Patentability effective Oct. 6, 2016, issued to International Application No. PCT/JP2015/058126 with an English Translation.
(Continued)

*Primary Examiner* — Scott A Browne
(74) *Attorney, Agent, or Firm* — Birch, Stewart, Kolasch & Birch, LLP

(57) ABSTRACT

A running device includes: a rubber crawler of an endless shape; a guide protrusion disposed in center, with respect to a width direction, of an inner circumferential surface of the rubber crawler; a driving protrusion disposed on each of opposite sides, with respect to the width direction, of the inner circumferential surface of the rubber crawler; and a track roller disposed over the guide protrusion, and configured to roll on the inner circumferential surface of the rubber crawler and to be in surface-contact with a side surface of the guide protrusion and a side surface of the driving protrusion. The track roller has side surfaces disposed on
(Continued)

end portions with respect to the width direction, surface-contactable with the side surface of the guide protrusion and the side surface of the driving protrusion, respectively. The side surfaces of the track roller are disposed facing the side surface of the guide protrusion and the side surface of the driving protrusion, respectively, so as to be in surface-contact with the side surface of the guide protrusion and the side surface of the driving protrusion in response to sway of the track roller in the width direction of the rubber crawler.

11 Claims, 8 Drawing Sheets

(56) References Cited

FOREIGN PATENT DOCUMENTS

| JP | 6-032262 A | 2/1994 |
|---|---|---|
| JP | 8-119161 A | 5/1996 |
| JP | 2005-225367 A | 8/2005 |
| JP | 2005-271658 A | 10/2005 |
| JP | 2007-145096 A | 6/2007 |
| JP | 2007-191089 A | 8/2007 |
| JP | 2007-216837 A | 8/2007 |

OTHER PUBLICATIONS

International Search Report (PCT/ISA/210) issued in PCT/JP2015/058126, dated Apr. 21, 2016.
Office Action effective Dec. 12, 2017, issued to the corresponding JP Application No. 2014-059842 with a machine translation.

* cited by examiner

RUNNING DEVICE

TECHNICAL FIELD

The present disclosure relates to a running device including a sprocket supported to be rotatably drivable, a rubber crawler wound around the sprocket rotatably, and a plurality of track rollers to roll on an inner circumferential surface of the rubber crawler.

BACKGROUND ART

A pair of such running devices is disposed on either side of a vehicle in the width direction, for instance, and is driven to cause the vehicle to run. The vehicle can turn by operating the running devices at different rotation speeds, for instance. A rubber crawler of such a running device provided for a vehicle has a smaller weight than a metal crawler and generates less running resistance and vibration, and is thereby used for a high-speed vehicle in general.

A type of rubber crawler, for instance, includes guide protrusions disposed at intervals on a center part, in the width direction, of an inner circumferential surface of a rubber elastic body formed into an endless shape, for preventing track rollers from falling off, and a pair of driving protrusions disposed at intervals on both sides, in the width direction, of the inner circumferential surface of the rubber elastic body, to engage with a sprocket. Such a rubber crawler does not have a metal reinforcement core material inside, and thus has less rigidity than a metal crawler.

In view of this, proposed is a rubber crawler provided with a plurality of steel cord rows extending in the circumferential direction of a rubber elastic body, and a plurality of bias cord rows extending diagonally at a predetermined angle from the circumferential direction of the rubber elastic body, disposed inside the rubber elastic body at least below the steel cord rows (see Patent Document 1). The steel cord rows reinforce a tension force that acts in the circumferential direction of the rubber elastic body, and the bias cord rows reinforce a force (e.g. torsion force) that acts in a sideway direction of the rubber elastic body.

A plurality of track rollers is disposed so as to be rollable on the inner circumferential surface of the rubber crawler. The track rollers absorb loads such as shock received from ground, and reduce vibration. Each track roller includes the first track-roller body part and the second track-roller body part, each having a disc shape, disposed to face each other and integrated over the guide protrusion in the width direction of the rubber crawler. The first track-roller body part is disposed between the guide protrusion and one of the pair of driving protrusions, while the second track-roller body part is disposed between the guide protrusion and the other one of the pair of driving protrusions. The track roller rolls on the inner circumferential surface of the rubber elastic body with the guide protrusion sandwiched between the first and second track-roller body parts.

CITATION LIST

Patent Literature

Patent Document 1: JP2007-191089A

SUMMARY

Problems to be Solved

During running, the rubber crawler rotates while circulating between the sprocket, which function as a driving wheel, and a driven wheel, and the track rollers roll on the inner circumferential surface of the rubber crawler in accordance with rotation of the rubber crawler. However, when the vehicle turns, the track roller tries to move toward one side in the width direction of the rubber crawler, and the guide protrusion sandwiched between the first and second track-roller body parts of the track roller may get damaged from receiving loads from the track roller in the width direction of the rubber crawler. Accordingly, the track roller may fall off from the rubber crawler.

In view of the above, an object of at least some embodiments of the present invention is to provide a running device free from a risk of damage to a guide protrusion of a rubber crawler and falling out of track rollers, during a turn of a vehicle.

Solution to the Problems

A running device according to some embodiments of the present invention comprises: a rubber crawler of an endless shape; a guide protrusion disposed in center, with respect to a width direction, of an inner circumferential surface of the rubber crawler; a driving protrusion disposed on each of opposite sides, with respect to the width direction, of the inner circumferential surface of the rubber crawler; and a track roller disposed over the guide protrusion, and configured to roll on the inner circumferential surface of the rubber crawler and to be in surface-contact with a side surface of the guide protrusion and a side surface of the driving protrusion. The track roller comprises side surfaces which are disposed on end portions with respect to the width direction, and which are surface-contactable with the side surface of the guide protrusion and the side surface of the driving protrusion, respectively. The side surfaces of the track roller are disposed facing the side surface of the guide protrusion and the side surface of the driving protrusion, respectively, so as to be in surface-contact with the side surface of the guide protrusion and the side surface of the driving protrusion in response to sway of the track roller in the width direction of the rubber crawler.

With the above running device, the side surfaces of the track roller are disposed facing the side surface of the guide protrusion and the side surface of the driving protrusion, respectively, so as to be in surface-contact with the side surface of the guide protrusion and the side surface of the driving protrusion in response to sway of the track roller in the width direction of the rubber crawler, and thereby the two protrusion, the guide protrusion and the driving protrusion, can receive loads applied to the guide protrusion from the track roller in the width direction of the rubber crawler in response to sway of the track roller. Accordingly, loads can be distributed over the guide protrusion and the driving protrusion, and thus it is possible to obtain a running device capable of preventing a risk of the guide protrusion getting damaged and the track roller falling off the running device.

Further, in some embodiments, the track roller includes a pair of track-roller body parts disposed to face each other on both sides, with respect to the width direction, of the guide protrusion. A side surface is formed on a circumferential edge portion on each side, with respect to the width direction, of each of the pair of track-roller body parts. The side surface of one of the pair of track-roller body parts surface-contacts the side surface of the guide protrusion, and the side surface of the other one of the pair of track-roller body parts surface-contacts the side surface of the driving protrusion, in response to sway of the track roller.

In this case, the side surface of one of the pair of track-roller body parts surface-contacts the side surface of the guide protrusion, and the side surface of the other one of the pair of track-roller body parts surface-contacts the side surface of the driving protrusion, in response to sway of the track roller, and thus, the two protrusion, the guide protrusion and the driving protrusion, can receive loads applied to the guide protrusion from the track roller in the width direction of the guide protrusion accompanying sway of the track roller. Accordingly, loads can be distributed over the guide protrusion and the driving protrusion, and thus it is possible to reduce the risk of damage to the guide protrusion.

Further, in some embodiments, a gap between the side surface of the one of the pair of track-roller body parts and the side surface of the guide protrusion has a size equal to a size of a gap between the side surface of the other one of the pair of track-roller body parts and the side surface of the driving protrusion.

In this case, a gap between the side surface of the one of the pair of track-roller body parts and the side surface of the guide protrusion has the same size as a gap between the side surface of the other one of the pair of track-roller body parts and the side surface of the driving protrusion, and thus the pair of track-roller body parts hit the driving protrusion and the guide protrusion at the same time, which makes it possible to equalize the amount of deformation for the driving protrusion and the guide protrusion. Furthermore, it is possible to equalize the abrasion amount for the contacting sections of the pair of track-roller body parts that contact the driving protrusion and the guide protrusion.

Further, in some embodiments, the guide protrusion and the driving protrusion disposed adjacently in the width direction of the rubber crawler are formed so that one of the guide protrusion or the driving protrusion has a smaller width-directional rigidity against a load applied in the width direction than the other one of the guide protrusion or the driving protrusion. A gap between the side surface of the one with a smaller with-directional rigidity of the guide protrusion or the driving protrusion and the side surface of the track roller is smaller than a gap between the side surface of the one with a greater with-directional rigidity of the guide protrusion or the driving protrusion and the side surface of the track roller.

In this case, a gap between the side surface of the one with a smaller with-directional rigidity of the guide protrusion or the driving protrusion and the side surface of the track roller is smaller than a gap between the side surface of the one with a greater with-directional rigidity of the guide protrusion or the driving protrusion and the side surface of the track roller, and thus, if a load is applied to the guide protrusion from the track roller in the width direction in response to sway of the track roller, the track roller contacts the protrusion having a lower width-directional rigidity to elastically deform the protrusion, and then contacts the protrusion having a higher width-directional rigidity. Thus, it is possible to receive loads with two protrusions, the guide protrusion and the driving protrusion. Accordingly, loads can be distributed over the guide protrusion and the driving protrusion, and thus it is possible to reduce the risk of damage to the guide protrusion.

Advantageous Effects

According to at least some embodiments of the present invention, it is possible to provide a running device free from a risk of a guide protrusion of a rubber crawler being torn off and a track roller falling off from the running device during a turn of a vehicle.

DETAILED DESCRIPTION

Embodiments of a rubber crawler of the present invention will now be described with reference to FIGS. 1 to 8. In the present embodiment, a running device mounted to a vehicle will be described as an example. It is intended, however, that unless particularly specified, dimensions, materials, shapes, relative positions and the like of components described in the embodiments shall be interpreted as illustrative only and not intended to limit the scope of the present invention.

Figure 1:
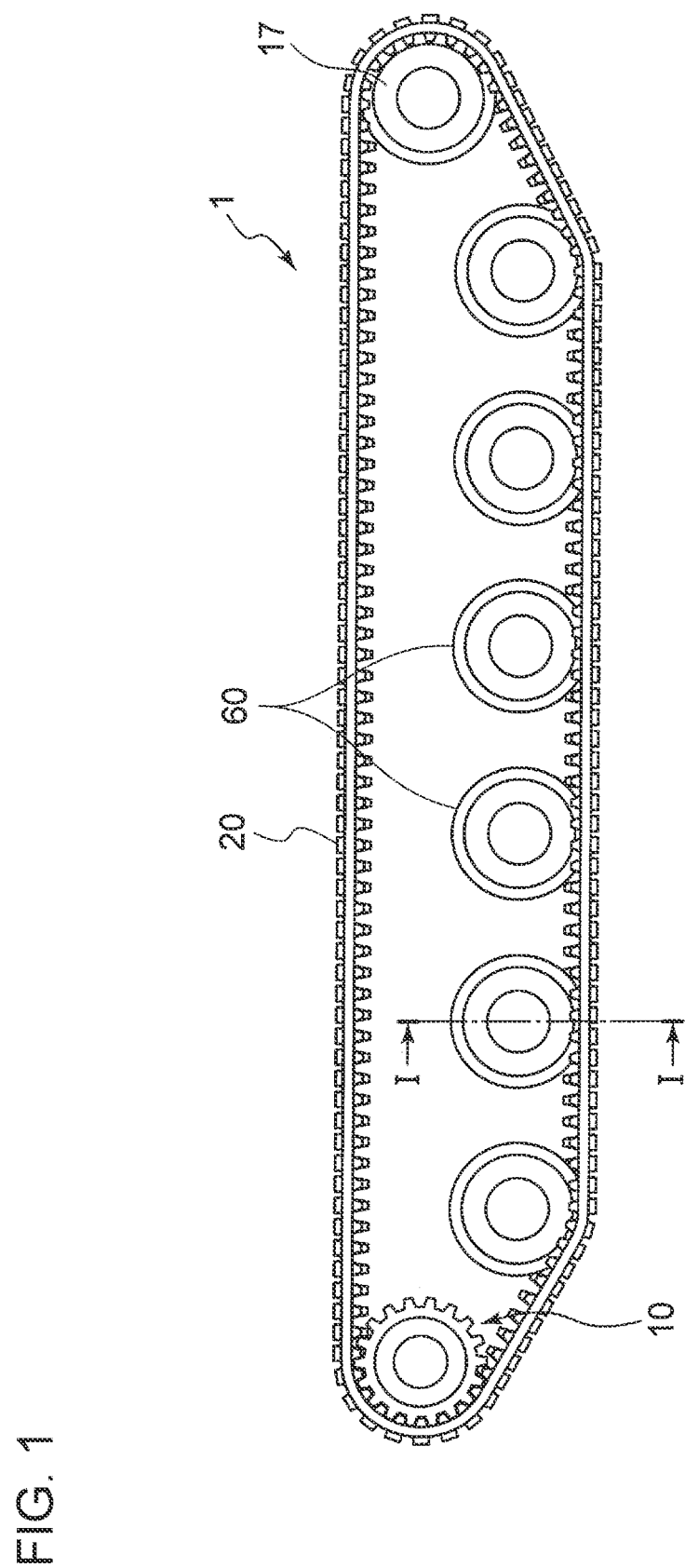
FIG. 1 is a side view of a running device including a sprocket on one end side, a driven wheel on the other end side, and a plurality of track rollers to roll on an inner circumferential surface of a rubber crawler wound around the sprocket and the driven wheel.

As depicted in FIG. 1 (side view), the running device 1 includes a driving wheel 10 supported rotatably drivable on an end portion, in the front-rear direction, of a side of a vehicle body of a vehicle (not depicted), a driven wheel 17 rotatably supported on the other end portion, in the front-rear direction, of the side of the vehicle body, a rubber crawler 20 wound around between the driving wheel 10 and the driven wheel 17, and a plurality of track rollers 60 which roll on an inner circumferential surface of a lower part of the rubber crawler 20.

Figure 2:
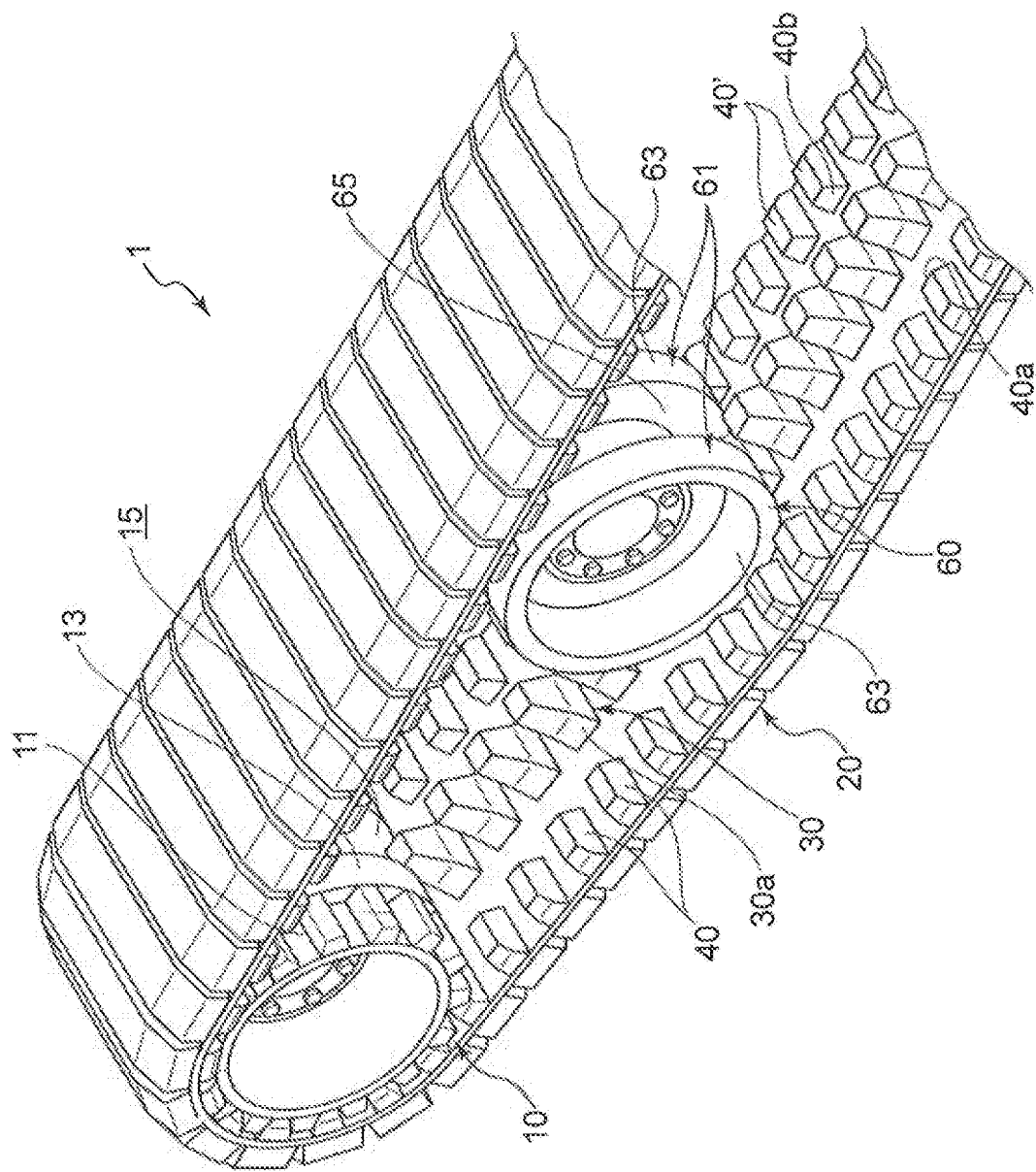
FIG. 2 is a partial perspective view of a running device taken from a section provided with a sprocket.
Figure 3:
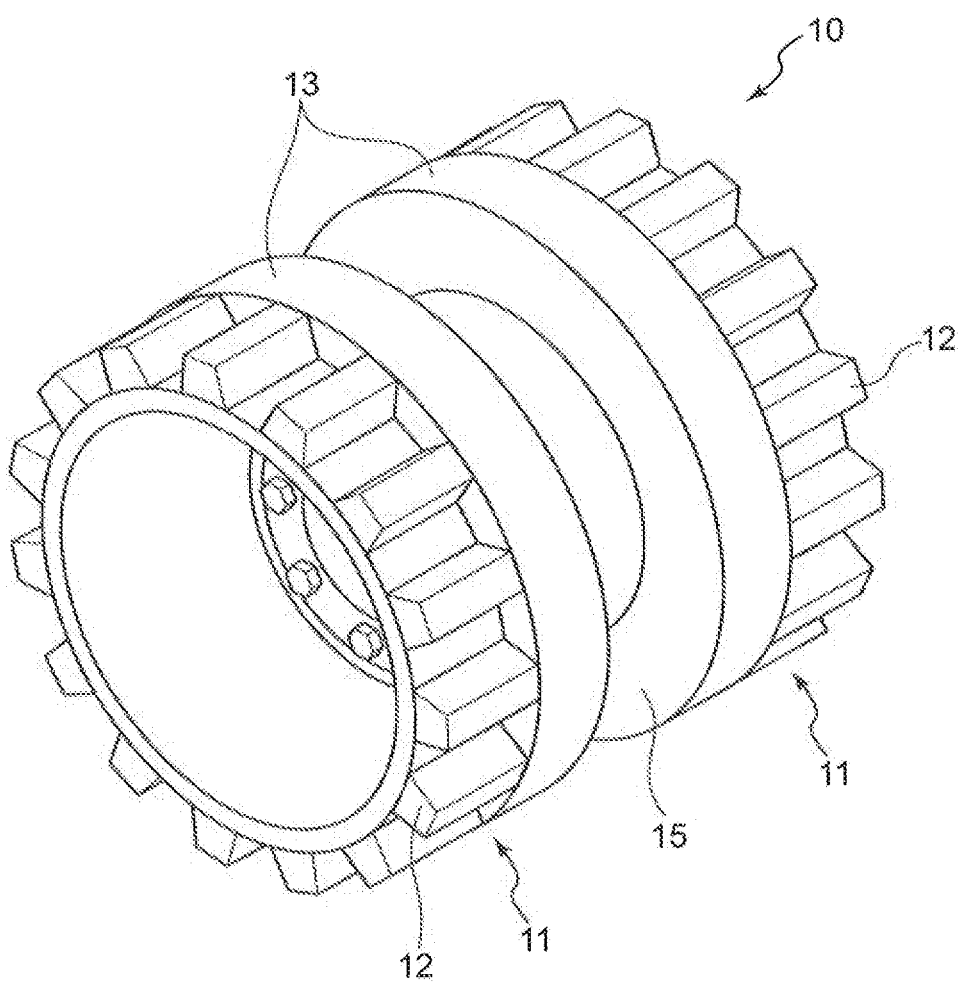
FIG. 3 is a perspective view of a sprocket.

The driving wheel 10 is, as depicted in FIGS. 2 and 3 (perspective views), rotatable in response to a driving force from an engine or the like mounted to the vehicle. The driving wheel 10 includes a pair of sprockets 11 disposed to face each other at a regular interval in the width direction, and the pair of sprockets 11 are mounted to a distal end portion of a driving shaft extending from the vehicle to form the driving wheel 10. A plurality of teeth 12 disposed at intervals in the circumferential direction is formed on an outer circumferential edge of the sprockets 11. The teeth 12 engage with driving protrusions 40 of the rubber crawler 20 to transmit a rotational force to the rubber crawler 20. A guide roller 13 for preventing the sprockets 11 from falling out from the rubber crawler 20 is disposed inside the sprockets 11, positioned coaxially with the sprockets 11. A gap 15 is formed between the guide rollers 13 of the pair of sprockets 11, and guide protrusions 30 are disposed in center in the width direction of the rubber crawler 20 so as to be capable of passing through the gap 15. Accordingly, the driving wheel 10 can transmit its rotational force to the rubber crawler 20 while being prevented from falling off from the rubber crawler 20 by the pair of guide rollers 13.

Figure 4:
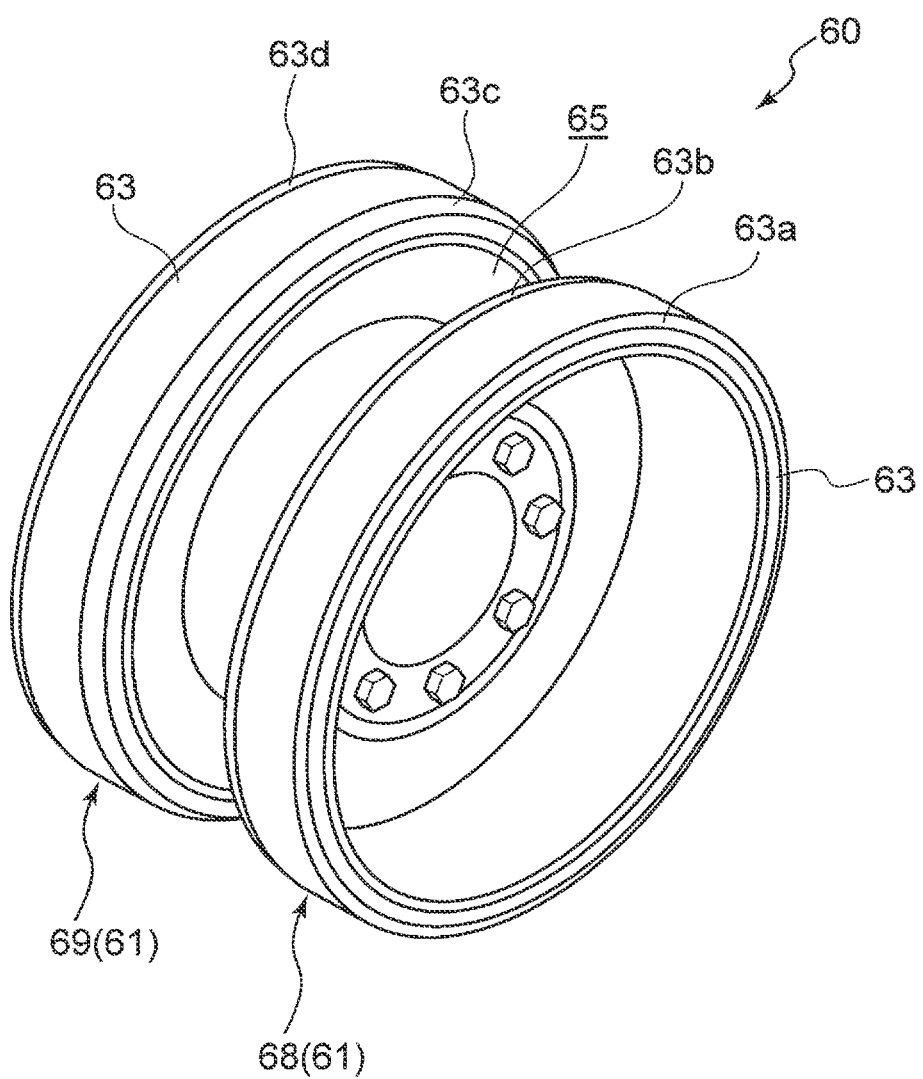
FIG. 4 is a perspective view of a track roller.

As depicted in FIG. 4 (perspective view), the track roller 60 includes a pair of track-roller body parts 61 disposed to face each other at an interval in the width direction, and the pair of track-roller body parts 61 is mounted rotatably to a distal end portion of a support shaft (not depicted) extending from the vehicle. The support shaft is supported movably in the vertical direction with respect to the vehicle body of the vehicle. An annular body 63 formed from rubber is mounted to an outer peripheral surface of the track-roller body part 61. The annular body 63 can absorb shock received from ground. A gap 65 is formed between the pair of track-roller body parts 61, similarly to the pair of sprockets 11, and the guide protrusions 30 of the rubber crawler 20 can pass through the gap 65. Of the pair of track-roller body parts 61, the track-roller body part 61 disposed on the outer side of the vehicle is referred to as "the first track-roller body part 68", and the track-roller body part 61 on the inner side of the vehicle is referred to as "the second track-roller body part 69".

The first outer slide-contact surface 63a is formed on a circumferential edge part on the outer side, with respect to the width direction, of the annular body 63 of the first track-roller body part 68, so as to have an annular shape along the circumferential edge part. The first outer slide-contact surface 63a is formed as a substantially-linear inclined surface that is inclined toward the inside of the first track-roller body part 68 with distance toward the outer side in the radial direction of the first track-roller body part 68. In the drawing, the first outer slide-contact surface 63a is inclined to form an angle of approximately 80 degrees with the inner circumferential surface 21a of the rubber elastic body 21. The first outer slide-contact surface 63a is disposed to face an inner surface of the driving protrusion 40. The inner surface of the driving protrusion 40 will be described below in detail.

Furthermore, the first inner slide-contact surface 63b is formed on a circumferential edge part on the inner side, with respect to the width direction, of the annular body 63 of the first track-roller body part 68, so as to have an annular shape along the circumferential edge part. The first inner slide-contact surface 63b is formed as a substantially-linear inclined surface that is inclined toward the inside of the first track-roller body part 68 with distance toward the outer side in the radial direction of the first track-roller body part 68. In the drawing, the first inner slide-contact surface 63b is inclined to form an angle of approximately 50 degrees with the inner circumferential surface 21a of the rubber elastic body 21. The first inner slide-contact surface 63b is disposed to face an outer surface of the guide protrusion 30. The outer surface of the guide protrusion 30 will be described below in detail.

Furthermore, the second outer slide-contact surface 63c is formed on a circumferential edge part on the outer side, with respect to the width direction, of the annular body 63 of the second track-roller body part 69, so as to have an annular shape along the circumferential edge part. The second outer slide-contact surface 63c is formed as a substantially-linear inclined surface that is inclined toward the inside of the second track-roller body part 69 with distance toward the outer side in the radial direction of the second track-roller body part 69. In the drawing, the second outer slide-contact surface 63c is inclined to form an angle of approximately 50 degrees with the inner circumferential surface 21a of the rubber elastic body 21. The second outer slide-contact surface 63c is disposed to face an inner surface of the guide protrusion 30. The inner surface of the guide protrusion 30 will be described below in detail.

Furthermore, the second inner slide-contact surface 63d is formed on a circumferential edge part on the outer side, with respect to the width direction, of the annular body 63 of the second track-roller body part 69, so as to have an annular shape along the circumferential edge part. The second inner slide-contact surface 63d is formed as a substantially-linear inclined surface that is inclined toward the inside of the second track-roller body part 69 with distance toward the outer side in the radial direction of the second track-roller body part 69. In the drawing, the second inner slide-contact surface 63d is inclined to form an angle of approximately 80 degrees with the inner circumferential surface 21a of the rubber elastic body 21. The second inner slide-contact surface 63d is disposed to face an inner surface of the driving protrusion 40. The inner surface of the driving protrusion 40 will be described below in detail.

Figure 5:
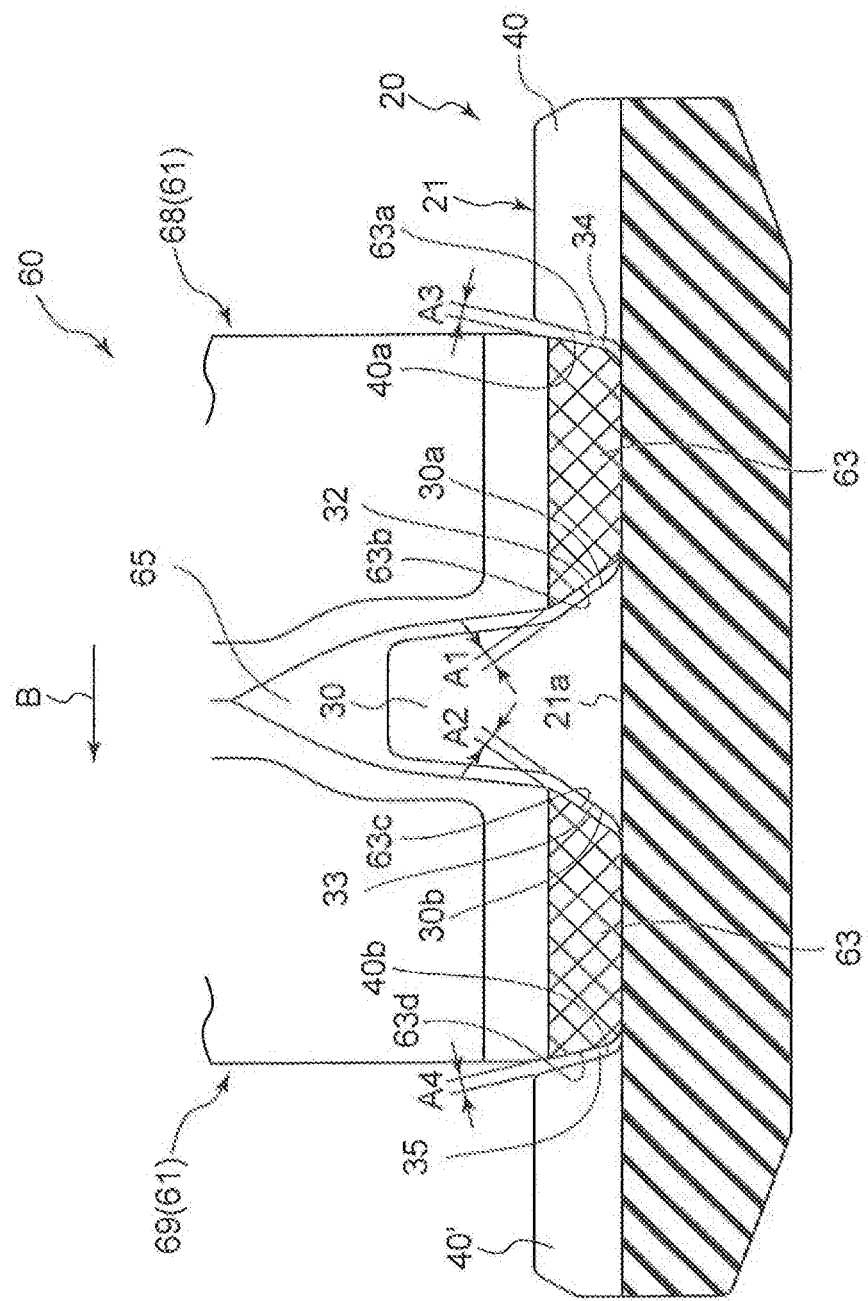
FIG. 5 is a cross-sectional view of a section corresponding to a view in the direction of arrows I-I in FIG. 1, where gaps are formed evenly between a track roller and a rubber crawler.

Next, the rubber crawler 20 will be described with reference to FIGS. 2 and 5. The rubber crawler 20 includes, as depicted in FIGS. 2 and 5, a rubber elastic body 21 of an endless shape, the guide protrusions 30 disposed at regular intervals in the circumferential direction on the center part, with respect to the width direction, of the inner circumferential surface 21a of the rubber elastic body 21, for preventing the track rollers 60 from falling off, and the driving protrusions 40 disposed at a regular pitch in the circumferential direction on both outer side portions, with respect to the width direction, of the inner circumferential surface 21a of the rubber elastic body 21 to engage with the sprockets 11.

The rubber elastic body 21 is formed from rubber into an endless band shape. A plurality of lugs 22 is formed on an outer peripheral surface 21b of the rubber elastic body 21 at intervals in the circumferential direction of the rubber elastic body 21, protruding outward in the radial direction.

Furthermore, the guide protrusions 30 disposed on the inner circumferential surface 21a of the rubber elastic body 21 are formed into a substantially cuboid shape extending in a direction substantially orthogonal to the inner circumferential surface 21a. The guide protrusions 30 are formed to gradually taper with distance from the inner circumferential surface 21a of the rubber elastic body 21, in a side view. Accordingly, when the rubber crawler 20 rotates while bending around the sprockets 11, contact between the guide protrusions 30 disposed adjacent to each other in the circumferential direction of the rubber crawler 20 is prevented.

A guide-protrusion outer surface 30a is formed on an outer side, with respect to the width direction, of a root side of each guide protrusion 30, disposed to face the first inner slide-contact surface 63b of the first track-roller body part 68 of the track roller 60. The guide-protrusion outer surface 30a is formed to extend substantially parallel to the first inner slide-contact surface 63b. A predetermined gap 32 is formed between the guide-protrusion outer surface 30a and the first inner slide-contact surface 63b. The size A1 of the gap 32 will be described below in detail.

Furthermore, a guide-protrusion inner surface 30b is formed on an inner side, with respect to the width direction, of the root side of each guide protrusion 30, disposed to face the second outer slide-contact surface 63c of the second track-roller body part 69 of the track roller 60. The guide-protrusion inner surface 30b is formed to extend substantially parallel to the second outer slide-contact surface 63c.

A predetermined gap 33 is formed between the guide-protrusion inner surface 30b and the second outer slide-contact surface 63c. The size A2 of the gap 33 will be described below in detail.

The guide protrusion 30 has such a size that enables passage through the gap 15 between the pair of sprockets 11 and the gap 65 between the pair of track-roller body parts 61 of the track roller 60, and such a height that enables restriction of falling out of the track roller 60 from the rubber crawler 20.

The driving protrusions 40, 40' disposed on either side, with respect to the width direction, of the inner circumferential surface 21a of the rubber elastic body 21 are formed to gradually taper with distance from the inner circumferential surface 21a of the rubber elastic body 21 in a side view, so as to have a horizontally long rectangular shape in a top view. An outside driving-protrusion inner surface 40a extending in the vertical direction is formed on an inner end, with respect to the width direction, of the driving protrusion 40 disposed on the outer side, with respect to the width direction, of the rubber elastic body 21. The outside driving-protrusion inner surface 40a is formed into a substantially-flat shape and disposed so as to face the first outer slide-contact surface 63a of the first track-roller body part 68. The outside driving-protrusion inner surface 40a is disposed so as to face the first outer slide-contact surface 63a of the first track-roller body part 68 and formed into a substantially-flat shape, and inclined outward in the width direction toward above. The outside driving-protrusion inner surface 40a is formed to extend substantially parallel to the first outer slide-contact surface 63a, and a gap 64 is formed between the outside driving-protrusion inner surface 40a and the first outer slide-contact surface 63a. The size A3 of the gap 33 will be described below in detail.

Furthermore, an inside driving-protrusion inner surface 40b extending in the vertical direction is formed on an inner end, with respect to the width direction, of the driving protrusion 40' disposed on the inner side, with respect to the width direction, of the rubber elastic body 21. The inside driving-protrusion inner surface 40b is disposed so as to face the second inner slide-contact surface 63d of the second track-roller body part 69 and formed into a substantially-flat shape. The inside driving-protrusion inner surface 40b is disposed so as to face the second inner slide-contact surface 63d of the second track-roller body part 69 and formed into a substantially-flat shape, and inclined outward in the width direction toward above. The inside driving-protrusion inner surface 40b is formed to extend substantially parallel to the second inner slide-contact surface 63d, and a gap 35 is formed between the inside driving-protrusion inner surface 40b and the second inner slide-contact surface 63d. The size A4 of the gap 35 will be described below in detail.

The driving protrusions 40, 40' are disposed on the inner circumferential surface 21a at the same pitch as the teeth 12 of the sprockets 11. Accordingly, the driving protrusions 40, 40' engage well with the teeth 12 of the sprockets 11, and thereby the driving force of the sprockets 11 is transmitted to the rubber elastic body 21 via the driving protrusions 40, 40'.

The pair of driving protrusions 40, 40' disposed on the opposite sides, with respect to the width direction, of the inner circumferential surface 21a of the rubber elastic body 21 is disposed linearly in a direction orthogonal to the circumferential direction of the rubber elastic body 21, together with the guide protrusion 30 disposed in center, with respect to the width direction, of the inner circumferential surface 21a.

The size A1 of the gap 32 between the guide-protrusion outer surface 30a and the first inner slide-contact surface 63b is equal to the size A4 of the gap 35 between the inside driving-protrusion inner surface 40b and the second inner slide-contact surface 63d. The size A2 of the gap 33 between the guide-protrusion inner surface 30b and the second outer slide-contact surface 63c is equal to the size A3 of the gap 64 between the outside driving-protrusion inner surface 40a and the first outer slide-contact surface 63a.

Next, operation of the running device 1 will be described with reference to FIGS. 1, 2, and 6. As depicted in FIGS. 1 and 2, when the driving wheel 10 rotates, the rubber crawler 20 rotates between the driving wheel 10 and the driven wheel 17 in accordance with rotation of the driving wheel 10. When the rubber crawler 20 rotates, the track roller 60 rolls on the inner circumferential surface 21a of the rubber elastic body 21 of the rubber crawler 20.

Figure 6:
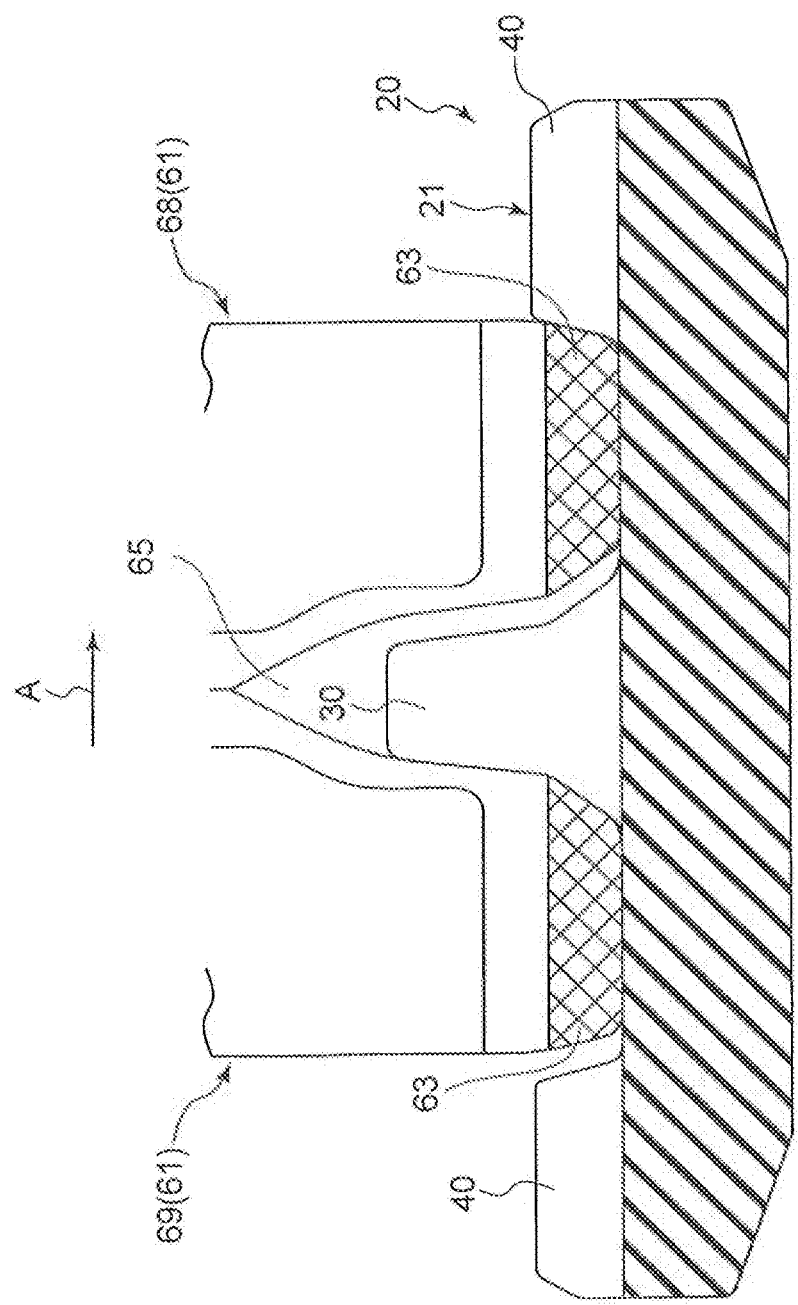
FIG. 6 is a cross-sectional view of a track roller and a rubber crawler where a side load is applied to the rubber crawler from the track roller.

Herein, if running devices 1 disposed on the right and left of the vehicle operate to turn the vehicle while the rubber crawler 20 is rotating, the track roller 60 sways and shifts toward one side (direction of arrow A), with respect to the width direction, of the rubber crawler 20 as depicted in FIG. 6, and a load acts on the guide protrusion 30 of the rubber crawler 20 from the track roller 60, toward one side in the width direction of the rubber crawler. When this load is applied, the first outer slide-contact surface 63a of the first track-roller body part 68 makes contact with the outside driving-protrusion inner surface 40a of the driving protrusion 40, and the second outer slide-contact surface 63c of the second track-roller body part 69 makes contact with the guide-protrusion inner surface 30b of the guide protrusion 30. Furthermore, these contacts take place substantially at the same time.

Thus, loads from the track roller 60 are received by two protrusions, the guide protrusion 30 and the driving protrusion 40. Accordingly, loads can be distributed over the guide protrusion 30 and the driving protrusion 40, and thus it is possible to reduce the risk of damage to the guide protrusion 30. Since the size A2 of the gap 33 between the guide-protrusion inner surface 30b and the second outer slide-contact surface 63c is equal to the size A3 of the gap 64 between the outside driving-protrusion inner surface 40a and the first outer slide-contact surface 63a, the first track-roller body part 68 and the second track-roller body part 69 of the track roller 60 contact the driving protrusion 40 and the guide protrusion 30 at the same time, respectively, and thus it is possible to equalize the deformation amount for the driving protrusion 40 and the guide protrusion 30. Furthermore, it is possible to equalize the abrasion amount for the contacting sections (annular bodies 63) of the first track-roller body part 68 and the second track-roller body part 69 of the track roller 60 to contact the driving protrusion 40 and the guide protrusion 30.

On the other hand, if the track roller 60 sways and shifts toward the other side (direction of arrow B), with respect to the width direction, of the rubber crawler 20 when the vehicle turns, as depicted in FIG. 5, a load acts on the guide protrusion 30 of the rubber crawler 20 from the track roller 60, toward the other side in the width direction of the rubber crawler. When this load is applied, the first inner slide-contact surface 63b of the first track-roller body part 68 makes contact with the guide-protrusion outer surface 30a of the guide protrusion 30, and the second inner slide-contact surface 63d of the second track-roller body part 69 makes contact with the inside driving-protrusion inner surface 40b of the driving protrusion 40'. Furthermore, these contacts take place substantially at the same time.

Thus, loads from the track roller 60 are received by two protrusions, the guide protrusion 30 and the driving protrusion 40. Accordingly, loads can be distributed over the guide protrusion 30 and the driving protrusion 40, and thus it is possible to reduce the risk of the guide protrusion 30 being torn off. Since the size A1 of the gap 32 between the guide-protrusion outer surface 30a and the first inner slide-contact surface 63b is equal to the size A4 of the gap 35 between the inside driving-protrusion inner surface 40b and the second inner slide-contact surface 63d, the first track-roller body part 68 and the second track-roller body part 69 of the track roller 60 contact the driving protrusion 40' and the guide protrusion 30 at the same time, respectively, and thus it is possible to equalize the deformation amount for the driving protrusion 40' and the guide protrusion 30. Furthermore, it is possible to equalize the abrasion amount for the contacting sections (annular bodies 63) of the first track-roller body part 68 and the second track-roller body part 69 of the track roller 60 that contact the driving protrusion 40' and the guide protrusion 30.

Figure 7:
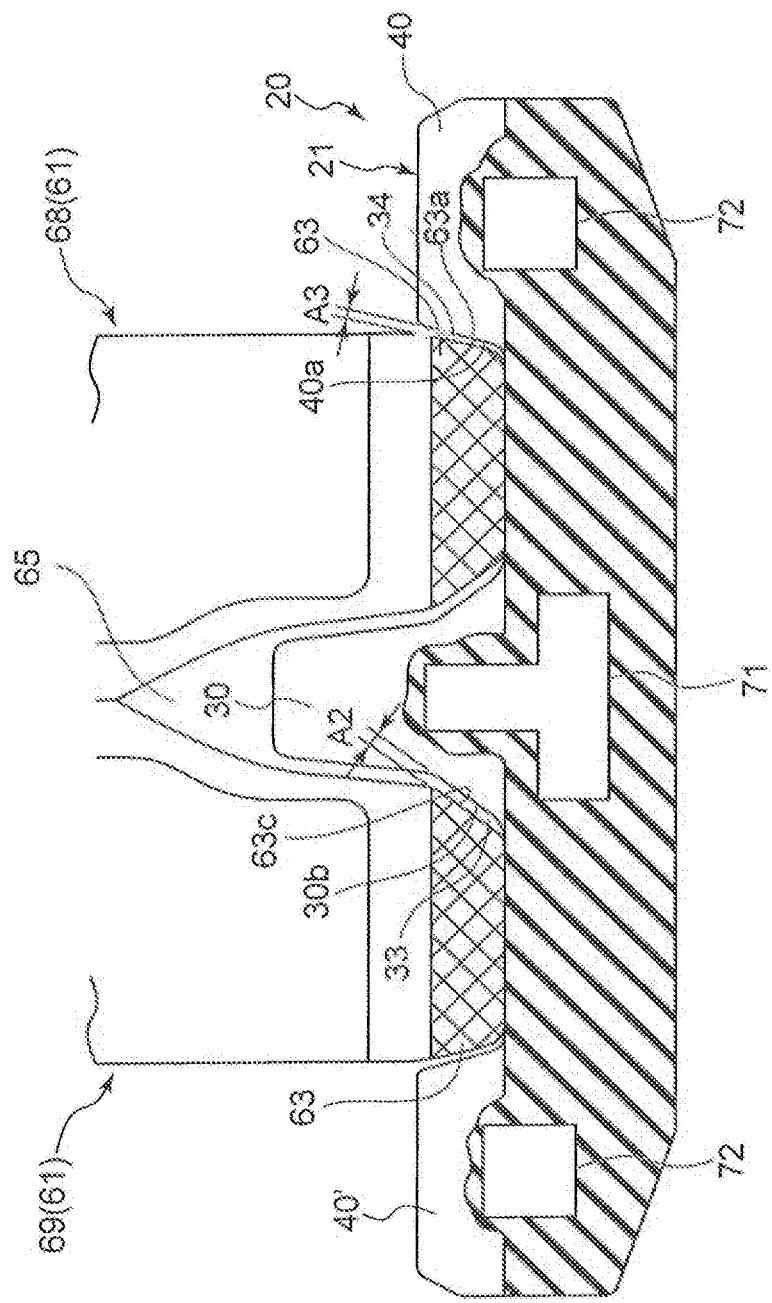
FIG. 7 is a cross-sectional view of a section corresponding to a view in the direction of arrows I-I, where gaps are not formed evenly between a track roller and a rubber crawler, according to another embodiment.

Furthermore, as depicted in FIG. 7, the size A3 of the gap 34 between the outside driving-protrusion inner surface 40a and the first outer slide-contact surface 63a is equal to the size A2 of the gap 33 between the guide-protrusion inner surface 30b and the second outer slide-contact surface 63c, the driving protrusion 40 may have a smaller width-directional rigidity than the guide protrusion 30. In this case, the width-directional rigidity can be adjusted by adjusting the installment position, inside the rubber elastic body, of core metals 71, 72 to be embedded in the rubber elastic body, for instance, without changing the rubber hardness of the rubber elastic body 21.

Figure 8:
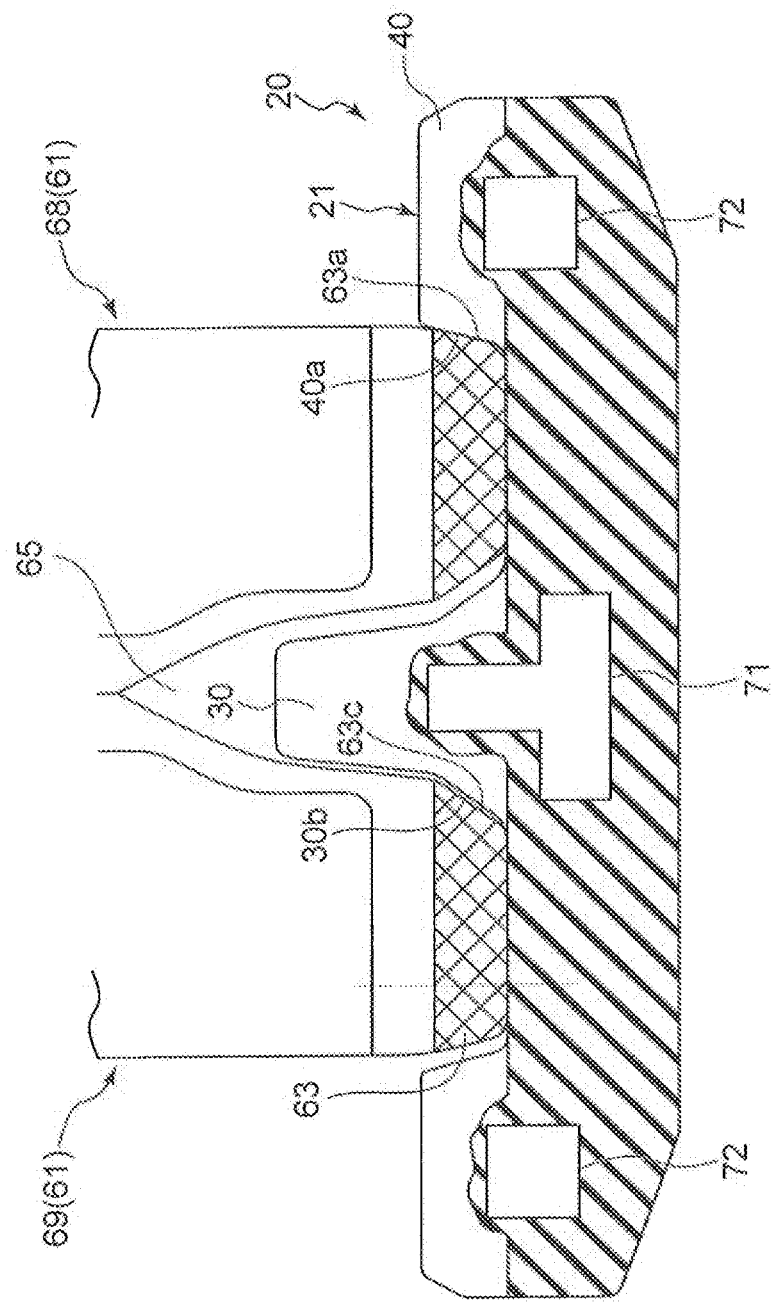
FIG. 8 is a cross-sectional view of a track roller and a rubber crawler where a side load is applied to the rubber crawler from the track roller, according to another embodiment.

Accordingly, as depicted in FIG. 8, if the track roller 60 sways and shifts toward one side in the width direction of the rubber crawler 20 during a turn of the vehicle, the first track-roller body part 68 of the track roller 60 firstly hits the driving protrusion 40 having a smaller width-directional rigidity to deform the driving protrusion 40. Then, after that, the second track-roller body part 69 of the track roller 60 hits the guide protrusion 30 having a greater elasticity. Thus, it is possible to receive loads with two guide protrusions, the protrusion 30 and the driving protrusion 40. Accordingly, loads can be distributed over the guide protrusion 30 and the driving protrusion 40, and thus it is possible to reduce the risk of damage to the guide protrusion 30.

The embodiments of the present invention have been described above. However, the present invention is not limited thereto, and various modifications may be applied as long as they do not depart from the object of the present invention. For instance, some of the above described embodiments may be combined upon implementation.

DESCRIPTION OF REFERENCE NUMERAL

1 Running device
10 Driving wheel
11 Sprocket
12 Teeth
13 Guide roller
15, 32, 33, 34, 35, 65 Gap
20 Rubber crawler
21 Rubber elastic body
21a Inner circumferential surface
21b Outer peripheral surface
22 Lug
30 Guide protrusion
30a Guide-protrusion outer surface (side surface)
30b Guide-protrusion inner surface (side surface)
40, 40' Driving protrusion
40a Outside driving-protrusion inner surface (side surface)
40b Inside driving-protrusion inner surface (side surface)
45 Steel cord row
46 Steel cord
47 Bias cord row
48 Bias cord
60 Track roller
61 Track-roller body part
63 Annular body
63a First outer slide-contact surface (side surface)
63b First inner slide-contact surface (side surface)
63c Second outer slide-contact surface (side surface)
63d Second inner slide-contact surface (side surface)
68 First track-roller body part (track-roller body part)
69 Second track-roller body part (track-roller body part)
71, 72 Core metal

The invention claimed is:

1. A running device, comprising:
   a rubber crawler of an endless shape;
   a guide protrusion disposed in center, with respect to a width direction, of an inner circumferential surface of the rubber crawler;
   a driving protrusion disposed on each of opposite sides, with respect to the width direction, of the inner circumferential surface of the rubber crawler; and
   a track roller disposed over the guide protrusion, and configured to roll on the inner circumferential surface of the rubber crawler,
   the track roller comprising a pair of track-roller body parts disposed on opposite sides, with respect to the width direction, of the guide protrusion, so as to face each other,
   wherein a side surface of one of the pair of track-roller body parts is configured to be in surface-contact with a side surface of the guide protrusion, and a side surface of the other one of the pair of track-roller body parts is configured to be in surface-contact with a side surface of the driving protrusion, in response to sway of the track roller in the width direction of the rubber crawler in a state both of the pair of track-roller body parts touch to the inner circumferential surface of the rubber crawler,
   wherein the pair of the track roller body parts is mounted rotatably to a distal end portion of a support shaft which is supported movably in the vertical direction with respect to a vehicle body of a vehicle,
   wherein an axis of the track roller is substantially parallel with a transverse extension of a track,
   wherein a first gap between the side surface of the one of the pair of track-roller body parts and the side surface of the guide protrusion has a size equal to a size of a second gap between the side surface of the other one of the pair of track-roller body parts and the side surface of the driving protrusion, and
   wherein sizes of the first gap and the second are measured along a plane that intersects both of the first gap and the second gap and is parallel to the inner circumferential surface of the crawler.

2. The running device according to claim 1,
   wherein the guide protrusion and the driving protrusion disposed adjacently in the width direction of the rubber crawler are formed so that one of the guide protrusion or the driving protrusion has a less width-directional rigidity against a load applied in the width direction than the other one of the guide protrusion or the driving protrusion, and wherein a gap between the side surface of the one with less width-directional rigidity of the guide protrusion or the driving protrusion and the side surface of one of the pair of track-roller body parts is smaller than a gap between the side surface of the one with a greater width-directional rigidity of the guide protrusion or the driving protrusion and the side surface of the other one of the pair of track-roller body parts.

3. The running device according to claim 1,
wherein the side surface of the one of the track-roller body part to be in surface-contact with the side surface of the guide protrusion is formed to extend substantially parallel to the side surface of the guide protrusion.

4. The running device according to claim 1,
wherein the side surface of the other one of the track-roller body part to be in surface-contact with the side surface of the driving protrusion is formed to extend substantially parallel to the side surface of the driving protrusion.

5. The running device according to claim 1,
wherein at least one of the side surfaces of the one of the track-roller body parts or the other one of the track-roller body parts is oblique to the inner circumferential surface of the rubber crawler.

6. The running device according to claim 3,
wherein at least one of the side surfaces of the one of the track-roller body parts or the other one of the track-roller body parts is oblique to the inner circumferential surface of the rubber crawler.

7. The running device according to claim 4,
wherein at least one of the side surfaces of the one of the track-roller body parts or the other one of the track-roller body parts is oblique to the inner circumferential surface of the rubber crawler.

8. The running device according to claim 1,
wherein an inclination angle between the inner circumferential surface of the rubber crawler and the side surface of the one of the track-roller body part to be in surface-contact with the side surface of the guide protrusion is smaller than an inclination angle between the inner circumferential surface of the rubber crawler and the side surface of the other one of the track-roller body part to be in surface-contact with the side surface of the driving protrusion.

9. The running device according to claim 5,
wherein an inclination angle between the circumferential surface of the rubber crawler and the side surface of the track-roller body part to be in surface-contact with the side surface of the guide protrusion is smaller than an inclination angle between the inner circumferential surface of the rubber crawler and the side surface of the track-roller body part to be in surface-contact with the side surface of the driving protrusion.

10. The running device according to claim 1,
wherein bottom faces of the pair of the track-roller body parts are contact with the inner circumferential surface.

11. A running device, comprising:
a rubber crawler of an endless shape;
a guide protrusion disposed in center, with reject to a width direction, of a inner circumferential surface of the rubber crawler;
a driving protrusion disposed on each of opposite sides, with respect to the width direction, of the inner circumferential surface of the rubber crawler; and
a track roller disposed over the guide protrusion, and configured to roll on the inner circumferential surface of the rubber crawler,
the track roller comprising a pair of track-roller body parts disposed on opposite sides, with respect to the width direction, of the guide protrusion, so as to face each other,
wherein a side surface of one of the pair of track-roller body parts is configured to be in surface-contact with a side surface of the guide protrusion, and a side surface of the other one of the pair of track-roller body parts is configured to be in surface contact with a side surface of the driving protrusion, in response to sway of the track roller in the width direction of the rubber crawler in a state both of the pair of track-roller body parts touch to the inner circumferential surface of the rubber crawler,
wherein the pair of the track roller body parts is mounted rotatably to a distal end portion of a support shaft which is supported movably in the vertical direction with respect to a vehicle body of a vehicle,
wherein an axis of the track roller is substantially parallel with a transverse extension of a track,
wherein the guide protrusion and the driving protrusion disposed adjacently in the width direction of the rubber crawler are formed so that one of the guide protrusion or the driving protrusion has a less width-directional rigidity against a load applied in the width direction than the other one of the guide protrusion or the driving protrusion, and
wherein a gap between the side surface of the one with less width-directional rigidity of the guide protrusion or the driving protrusion and the side surface of one of the pair of track-roller body parts is smaller than a gap between the side surface of the one with a greater width-directional rigidity of the guide protrusion or the driving protrusion and the side surface of the other one of the pair of track-roller body parts.

* * * * *